(12) United States Patent
Matthews et al.

(10) Patent No.: US 10,197,441 B1
(45) Date of Patent: Feb. 5, 2019

(54) LIGHT DETECTOR AND A METHOD FOR DETECTING LIGHT

(71) Applicant: Applied Materials Israel Ltd., Rehovot (IL)

(72) Inventors: Raphael Matthews, Ra'anana (IL); Tal Kuzniz, Kfar-Saba (IL); Pavel Margulis, Ashdod (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 15/883,654

(22) Filed: Jan. 30, 2018

(51) Int. Cl.
*G01J 1/44* (2006.01)
(52) U.S. Cl.
CPC ........... *G01J 1/44* (2013.01); *G01J 2001/442* (2013.01); *G01J 2001/4446* (2013.01)
(58) Field of Classification Search
CPC .... G01J 2001/0481; G01J 3/42; G01J 5/0003; G01J 1/44; G01J 2001/442; G01J 2001/4446
USPC ...................................................... 250/336.1
See application file for complete search history.

(56) References Cited

U.S. PATENT DOCUMENTS

| | | | | | |
|---|---|---|---|---|---|
| 3,483,421 | A * | 12/1969 | Hogan | .................... | G06E 3/003 250/214.1 |
| 6,317,622 | B1 * | 11/2001 | Weisenberger | ...... | A61B 6/4057 600/431 |
| 6,400,088 | B1 * | 6/2002 | Livingston | ............ | B82Y 10/00 250/338.1 |
| 2003/0222203 | A1 * | 12/2003 | Sun | ....... | H01G 9/2059 250/214.1 |
| 2004/0227070 | A1 * | 11/2004 | Bateman | ............... | H01J 43/246 250/287 |
| 2007/0051879 | A1 * | 3/2007 | Kuzniz | ................. | H01J 31/501 250/214 VT |
| 2008/0272280 | A1 * | 11/2008 | Pinkas | .................. | H01J 31/508 250/214 VT |
| 2009/0140157 | A1 * | 6/2009 | Meng | ...................... | G01T 1/249 250/370.11 |
| 2011/0095178 | A1 * | 4/2011 | Giannakopulos | ..... | H01J 49/025 250/282 |
| 2011/0260069 | A1 * | 10/2011 | Wang | .................... | H01J 37/244 250/370.01 |
| 2012/0326044 | A1 * | 12/2012 | Ghelmansarai | .......... | G01T 1/16 250/370.07 |
| 2013/0043377 | A1 * | 2/2013 | Schreiber | ................ | H01J 40/02 250/238 |

(Continued)

*Primary Examiner* — Taeho Jo
(74) *Attorney, Agent, or Firm* — Kilpatrick Townsend & Stockton LLP

(57) ABSTRACT

A method and a light detector that includes (i) a photon to electron converter a photon to one or more photoelectrons; (ii) a photoelectron detection circuit that includes a photoelectron sensing region; (iii) a chamber; (iv) a bias circuit that is configured to supply to the light detector one or more biasing signals for accelerating a propagation of the one or more photoelectrons within the chamber and towards the photoelectron sensing region; (iv) a photoelectron manipulator that is configured to operate in a selected operational mode out of multiple operational modes that differ by their level of blocking, (v) a controller that is configured to control the photoelectron manipulator based on a feedback about the at least one of (a) the photon, (b) the one or more photoelectrons, (c) a previous photon and, (d) previous one or more photoelectrons.

20 Claims, 18 Drawing Sheets

(56) References Cited

U.S. PATENT DOCUMENTS

| | | | | |
|---|---|---|---|---|
| 2013/0148112 A1* | 6/2013 | Chuang | ............... | G01N 21/88 |
| | | | | 356/237.1 |
| 2013/0256525 A1* | 10/2013 | Hill, Jr. | ............... | H01J 49/02 |
| | | | | 250/282 |
| 2014/0151529 A1* | 6/2014 | Steiner | ............... | H01J 43/20 |
| | | | | 250/207 |
| 2014/0306098 A1* | 10/2014 | Widzgowski | ............... | H01J 40/02 |
| | | | | 250/214.1 |
| 2015/0060663 A1* | 3/2015 | Sipila | ............... | G01N 23/2252 |
| | | | | 250/307 |
| 2016/0370476 A1* | 12/2016 | Milnes | ............... | H01J 31/49 |
| 2016/0372309 A1* | 12/2016 | Steiner | ............... | H01J 43/20 |
| 2017/0287667 A1* | 10/2017 | Letexier | ............... | H01J 31/56 |
| 2017/0323761 A1* | 11/2017 | Luo | ............... | H01J 37/18 |

\* cited by examiner

LIGHT DETECTOR AND A METHOD FOR DETECTING LIGHT

BACKGROUND

A light detector based on 'phototube' device, such as a hybrid photon detector (HPD) sensor, may work at high gains (for example—gains that range between 100 and 200,000).

These high gains are required in order to detect very weak signals (even single photons)—such as weak signals from the bottom of high aspect ratio holes in wafer scanning applications.

When scanning a wafer with high contrast, certain patterns of the wafer (usually highly reflective patterns) reflect a light beam that includes many photons for long durations thereby resulting in long durations of high anode currents. The long duration may be regarded as about one microsecond and high anode currents have a magnitude which may even reach a few tens of milli-Amperes.

The long duration high anode current may cause the HPD sensor to be damaged or otherwise heated. The heating of the HPD sensor may result in gain changes that are hard to measure or predict.

There is a need to provide a light detector of high gain that will withstand long durations of strong light beams.

SUMMARY

There are provided a light detector and a method for sensing light.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Any reference to a light detector should be applied, mutatis mutandis to a method that is executed by the light detector.

Any reference to method should be applied, mutatis mutandis to a light detector that is configured to execute the method.

There may be provided a light detector that may include (i) a photon to electron converter that is configured to convert a photon that impinges on the photon to electron converter to one or more photoelectrons; (ii) a photoelectron detection circuit that includes a photoelectron sensing region; (iii) a chamber; (iv) a bias circuit that is configured to supply to the light detector one or more biasing signals for accelerating a propagation of the one or more photoelectrons within the chamber and towards the photoelectron sensing region; (v) a photoelectron manipulator that is configured to operate in a selected operational mode out of multiple operational modes, the multiple operational modes differ from each other by a level of blocking of the one or more photoelectrons from reaching the photoelectron sensing region; and (vi) a controller that is configured to control the photoelectron manipulator based on a feedback about the at least one of (a) the photon, (b) the one or more photoelectrons, (c) a previous photon that previously impinged on the photon to electron converter and, (d) previous one or more photoelectrons that were previously outputted by the photon to electron converter.

Figure 1:
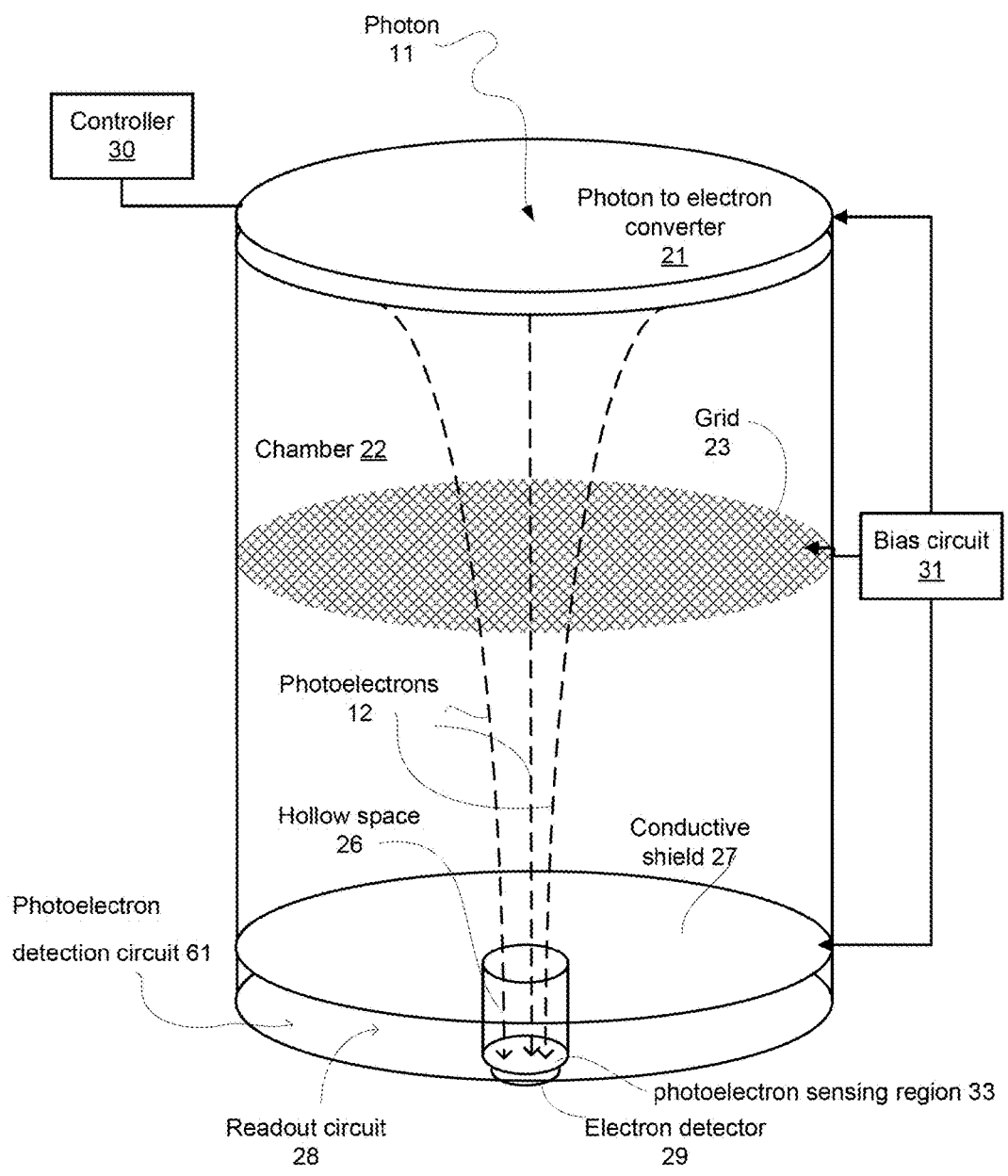
FIG. 1 illustrates an example of a light detector.

FIG. 1 illustrates a light detector 10 as including photon to electron converter 21, chamber 22, photoelectron manipulator such as grid 23, electron detector 29 that is preceded by a hollow space 26 and readout circuit 28 that are shielded by conductive shield 27, electron detector 29, controller 30 and bias circuit 31.

Grid 23 is conductive.

Light detector 10 may be any of the following detectors: Reflected hybrid photon detector (RHPD), HPD, a photo multiplier (PMT), a reflected PMT, an electron bombardment charged-coupled device CCD (EBCCD), an electron-beam imager (i.e. a sensing device which is a camera), or the like.

The readout circuit 28 and electron detector 29 form a photoelectron detection circuit 61.

Grid 23 of FIG. 1 operates in a non-blocking operational mode—the grid 23 is fed with biasing signals that do not interfere with the progress of photoelectrons 12 towards the photoelectron sensing region 33 of the electron detector 29.

Photon 11 impinges on the photon to electron converter 21 causes photoelectrons 12 to propagate through grid 23, through hollow space 26 and to impinge on photoelectron sensing region 33 of the electron detector 29.

The electron detector 29 is coupled to a readout circuit for reading the detection signals of the electron detector 29.

The photon to electron converter 21 and the electron detector 29 are positioned at opposite sides of chamber 22.

The electron detector may be an avalanche detector that may operate in a non-Geiger mode or may be any other electron detector.

The area between the photon to electron converter 21 and the electron detector 29 may be regarded as an electron bombardment region in which the photoelectrons are accelerated by bias signals that introduce potential differences of one till multiple kilovolts (for example—between three to eight kilovolts) between the photon to electron converter 21 and the electron detector 29.

A bombardment gain (Gb) obtained in the electron bombardment regions may range between two hundred to one thousand and seven hundred.

The gain (Ged) of the electron detector 29 may range between one and five hundred.

The overall gain of the light detector substantially equals Gb multiplied by Ged.

Figure 2:
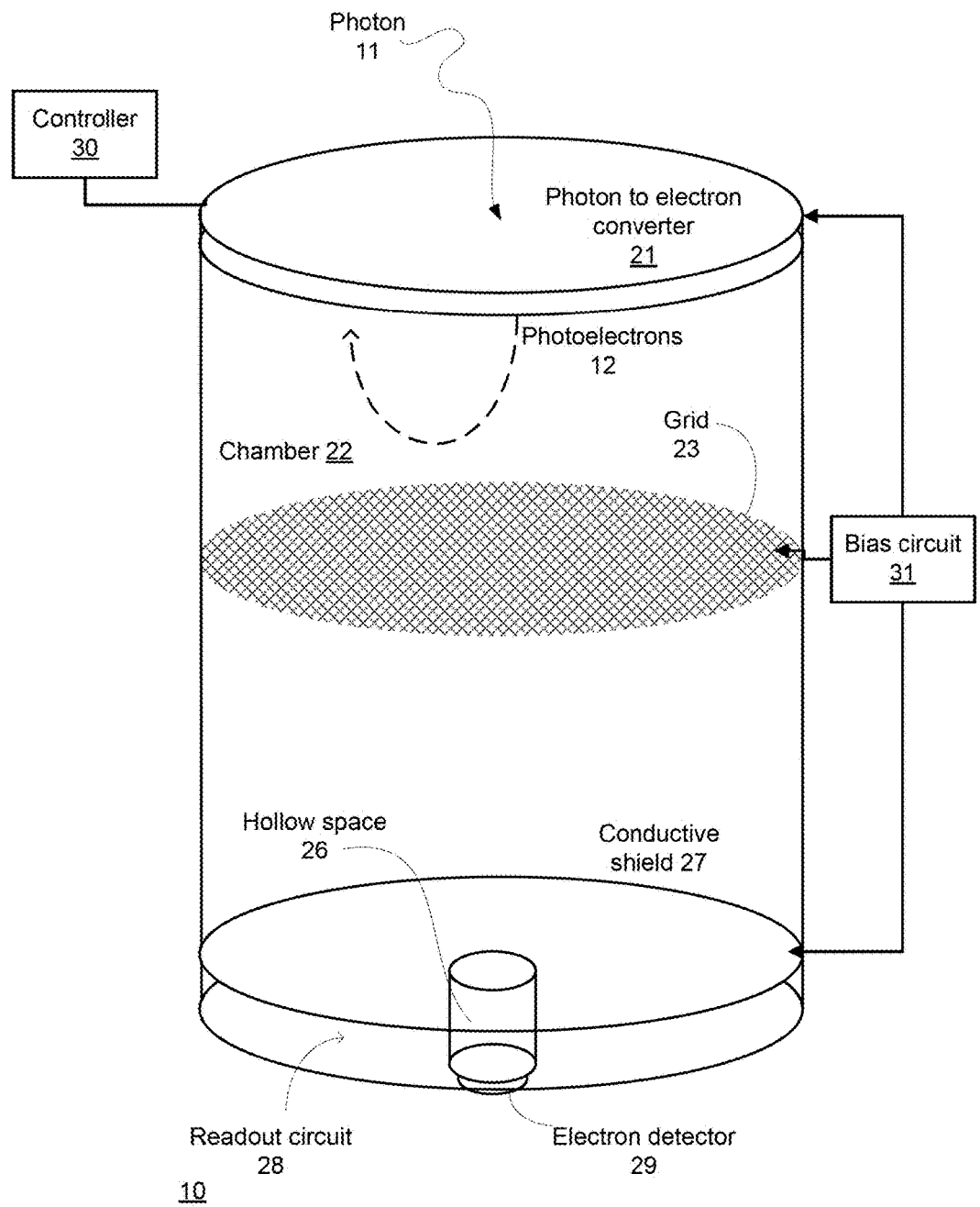
FIG. 2 illustrates an example of a light detector.

FIG. 2 illustrates the light detector 10 as including photon to electron converter 21, chamber 22, a photoelectron manipulator such as grid 23, electron detector 29 that is preceded by a hollow space 26, and a readout circuit 28 that are shielded by conductive shield 27, controller 30 and bias circuit 31.

In FIG. 2, the grid 23 operates at a blocking operational mode—and photoelectrons 12 are deflected towards the photon to electron converter 21. The grid 23 may be biased to be more negative than the potential of the photon to electron converter 21.

Figure 3:
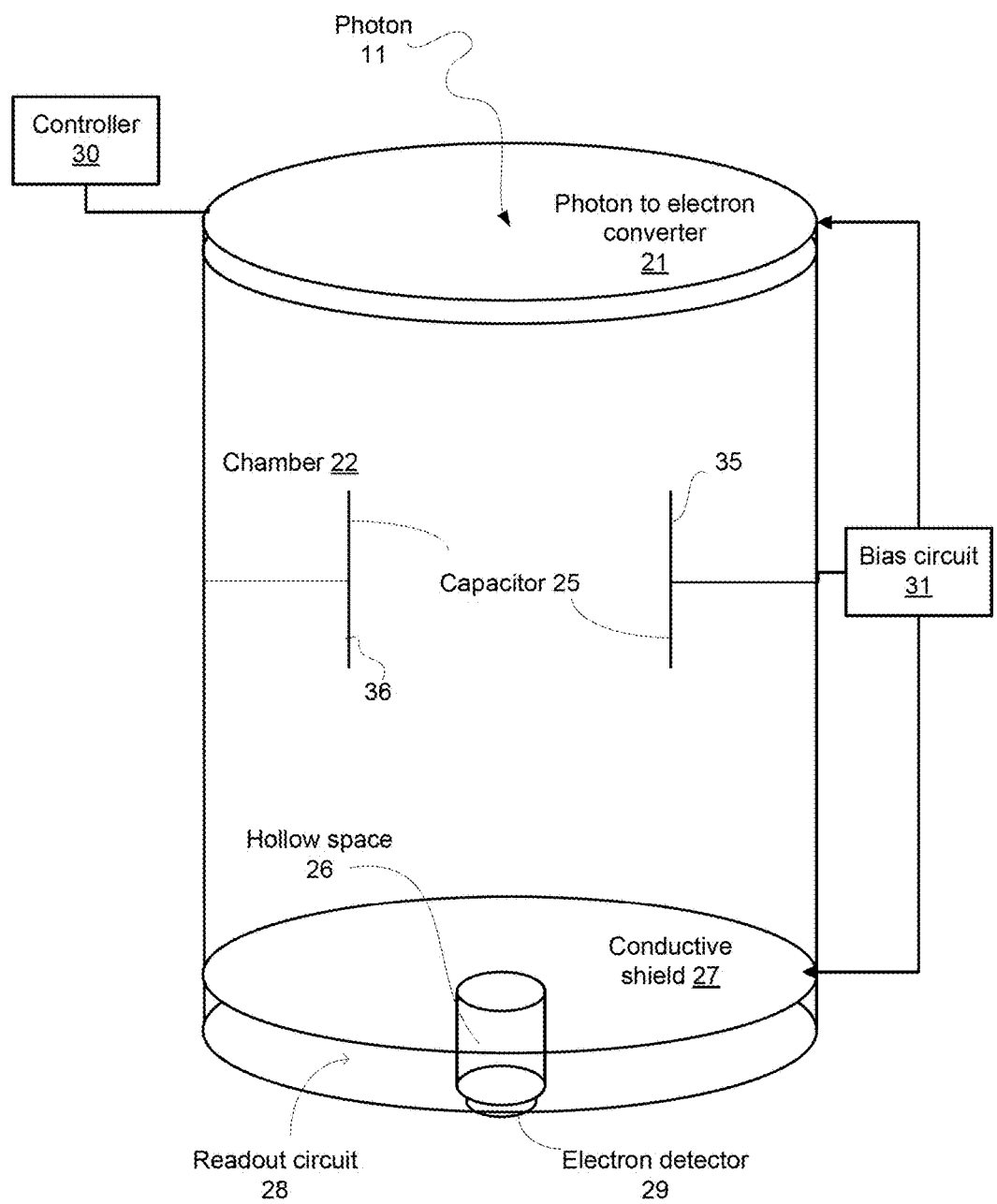
FIG. 3 illustrates an example of a light detector.

In FIG. 3 the photoelectron manipulator is a capacitor 25 that include two plates 35 and 36 that are parallel to the longitudinal axis of chamber 22.

The capacitor may be of different configuration. For example, instead of including two parallel plates the capacitor may be a sphere capacitor, a double wire capacitor, an octopod capacitor, and the like.

The capacitor may deflect the photoelectrons or not deflect the photoelectrons-depending on the operational mode if the capacitor—as set by bias circuit 31.

Figure 4:
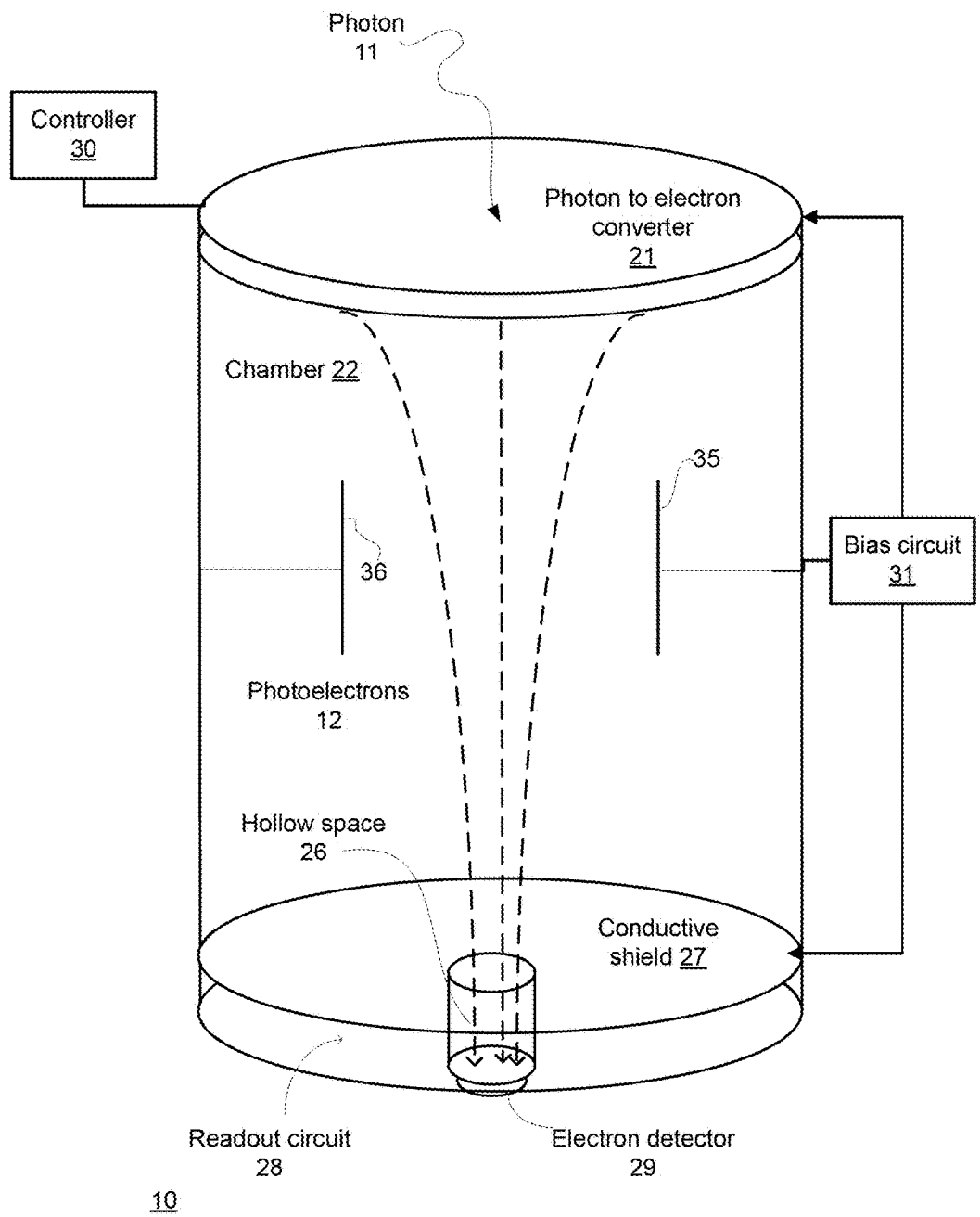
FIG. 4 illustrates an example of a light detector.

In FIG. 4 the capacitor 25 operates in the non-blocking operations mode—the capacitor 25 does not prevent the photoelectrons from reaching the photoelectron sensing region 33.

Figure 5:
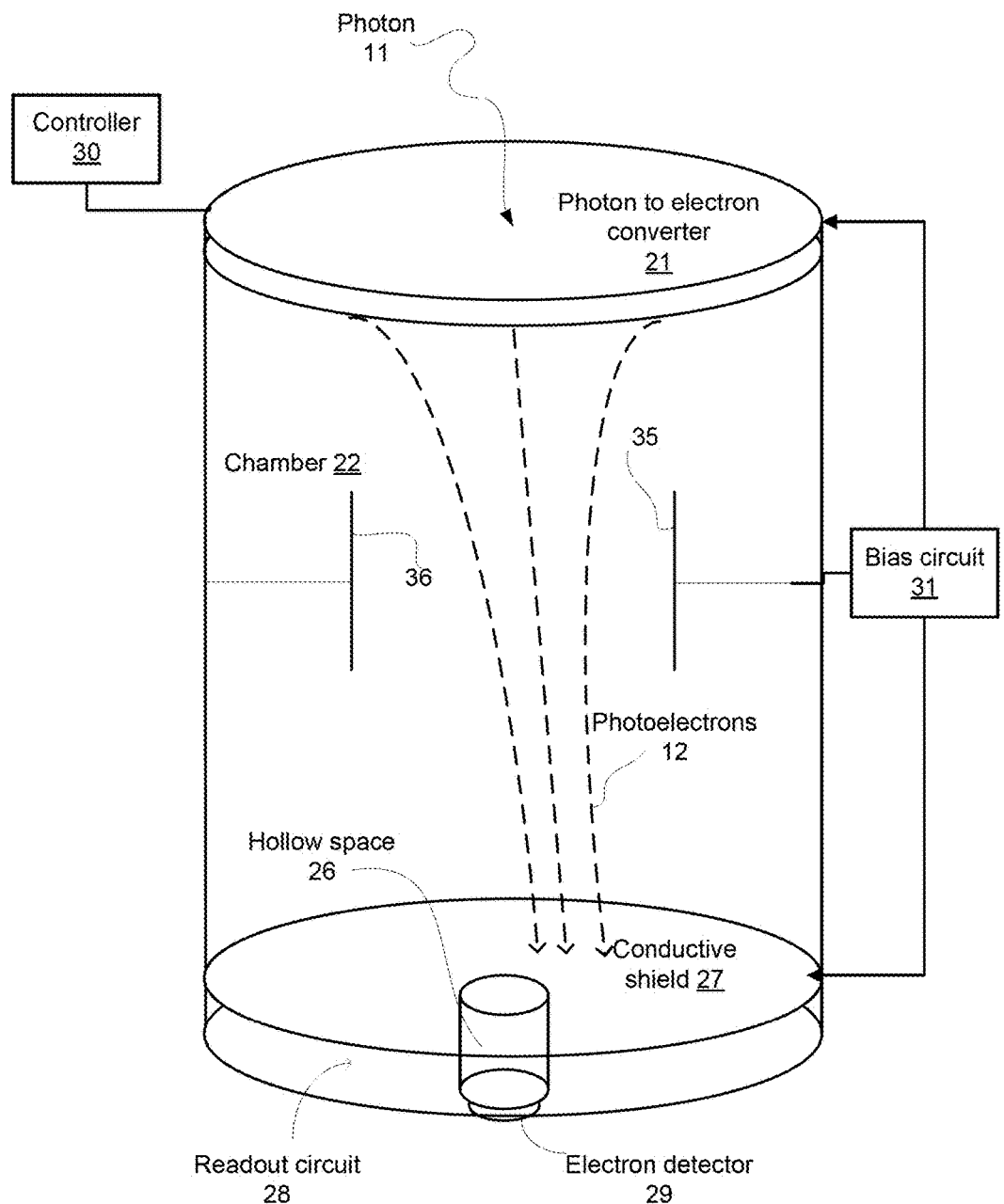
FIG. 5 illustrates an example of a light detector.

In FIG. 5 the capacitor operates in the blocking operational mode and prevents the photoelectrons from reaching the photoelectron sensing region 33.

In FIG. 5 the capacitor deflects the photoelectrons to impinge on the conductive shield 27.

Figure 6:
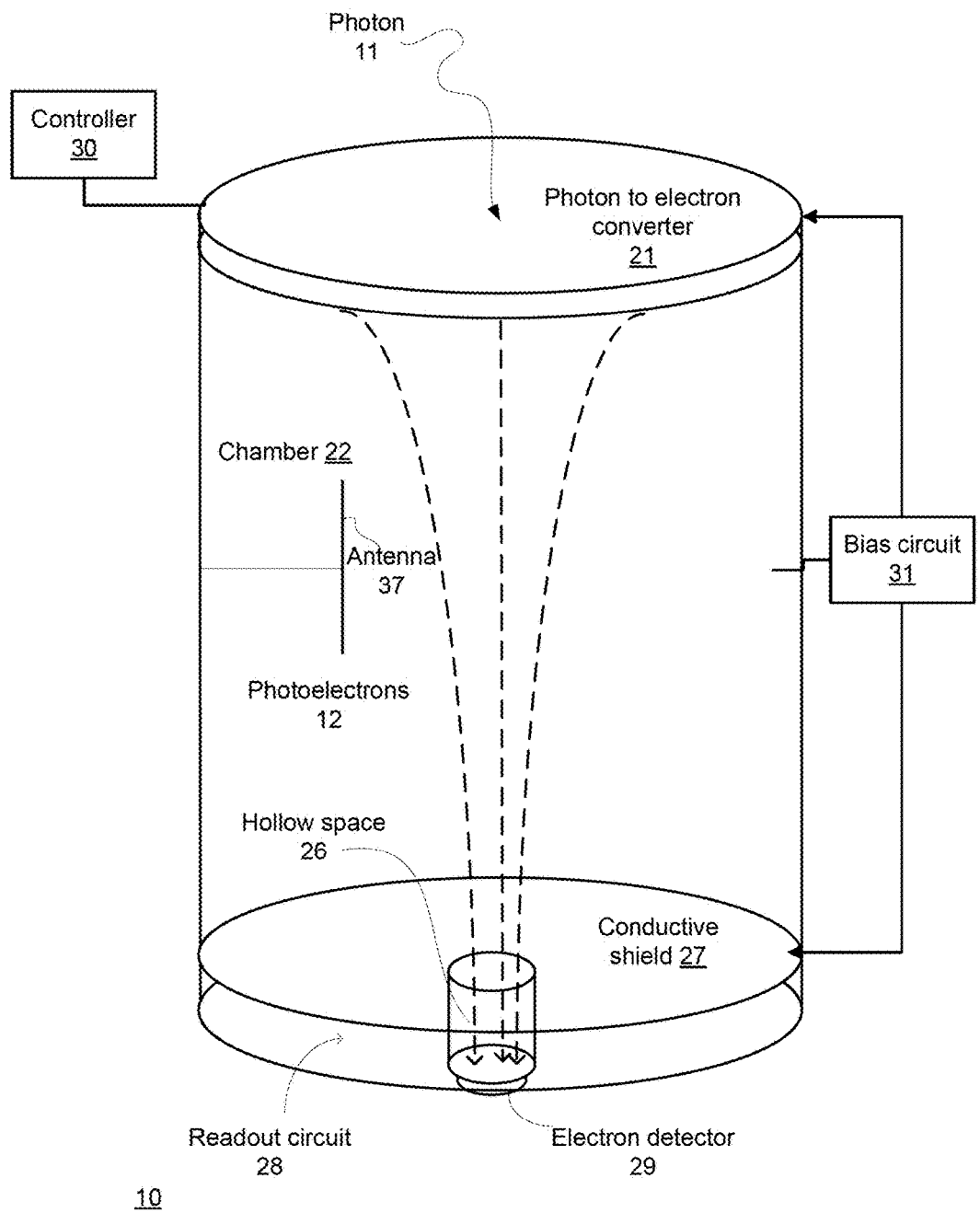
FIG. 6 illustrates an example of a light detector.

In FIG. 6 the photoelectron manipulator is an antenna type deflector 37 that may deflect the photoelectrons.

Figure 7:
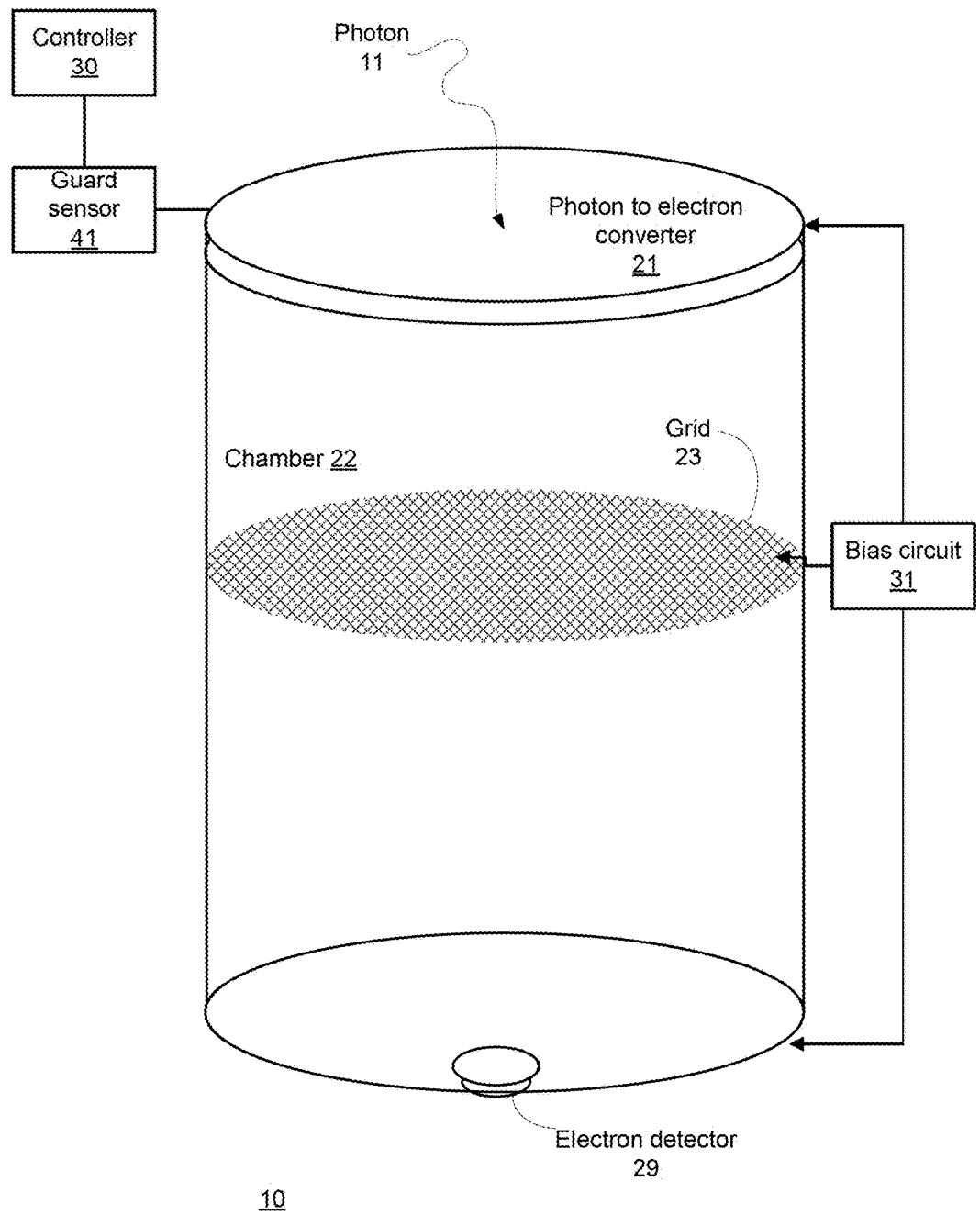
FIG. 7 illustrates an example of a light detector.

FIG. 7 illustrates controller 30 that is coupled to guard sensor 41. The guard sensor 41 may sense a current, temperature or any electrical signal generated by the photon to electron converter 21 in response to a beam of light that impinges on the photon to electron converter 21. Detection signals from the guard sensor 41 are fed to the controller 30. The controller may determine in which mode to operate grid 23 based on these detection signals.

Figure 8:
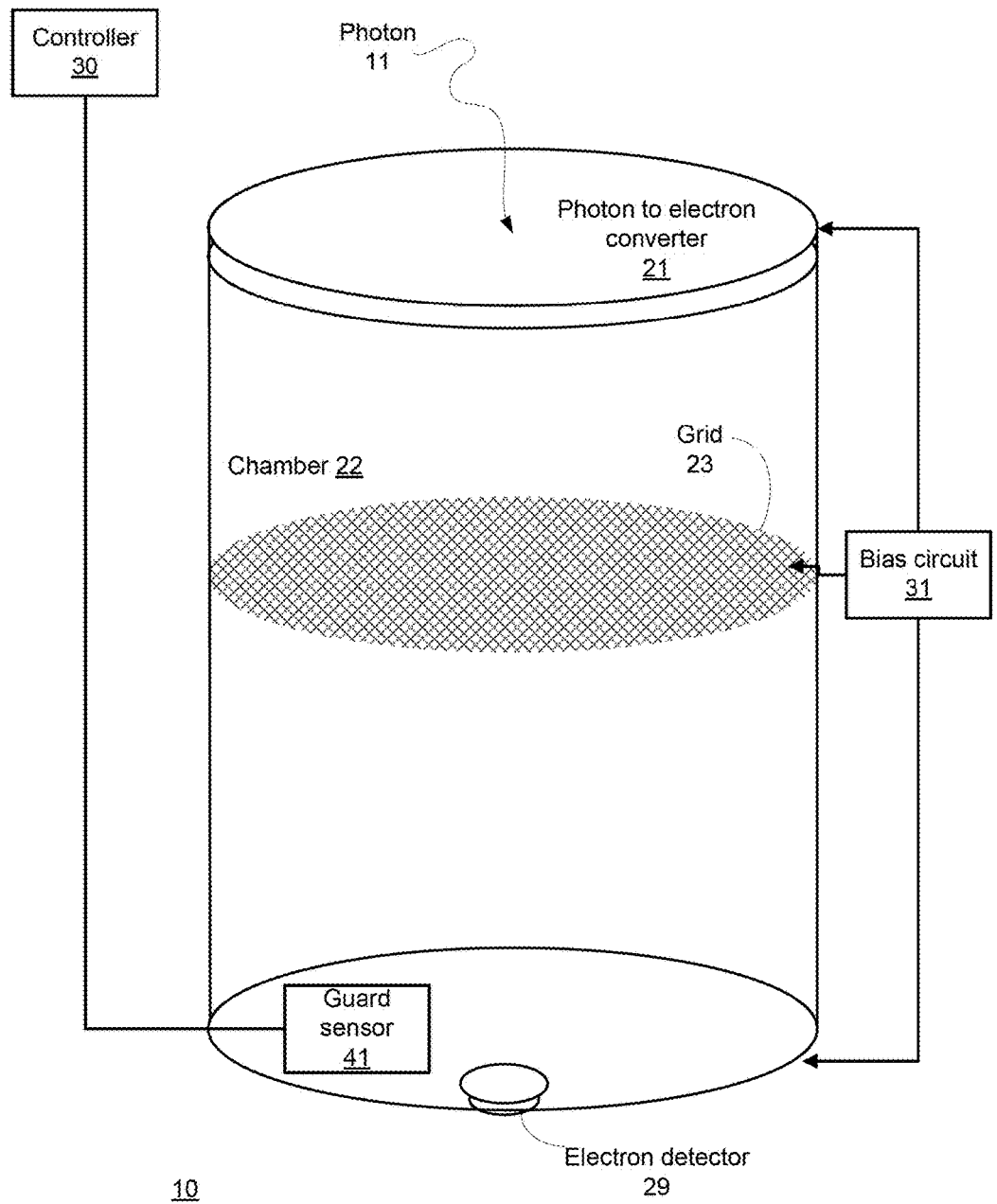
FIG. 8 illustrates an example of a light detector.

FIG. 8 illustrates controller 30 that is coupled to guard sensor 41. The guard sensor 41 is positioned within the chamber 22.

The grid may deflect the photoelectrons to the guard sensor 41 so that the guard sensor may sense the intensity of the photoelectrons.

Alternatively, the guard sensor 41 may be combined with the electron detector 29 or readout circuit 28, in order to sense at least part of the photoelectron current impinging on the electron detector.

The guard sensor 41 may be less sensitive than the electron detector 29—as the guard sensor is used for sensing photoelectrons resulting from relatively strong light beams.

Figure 9:
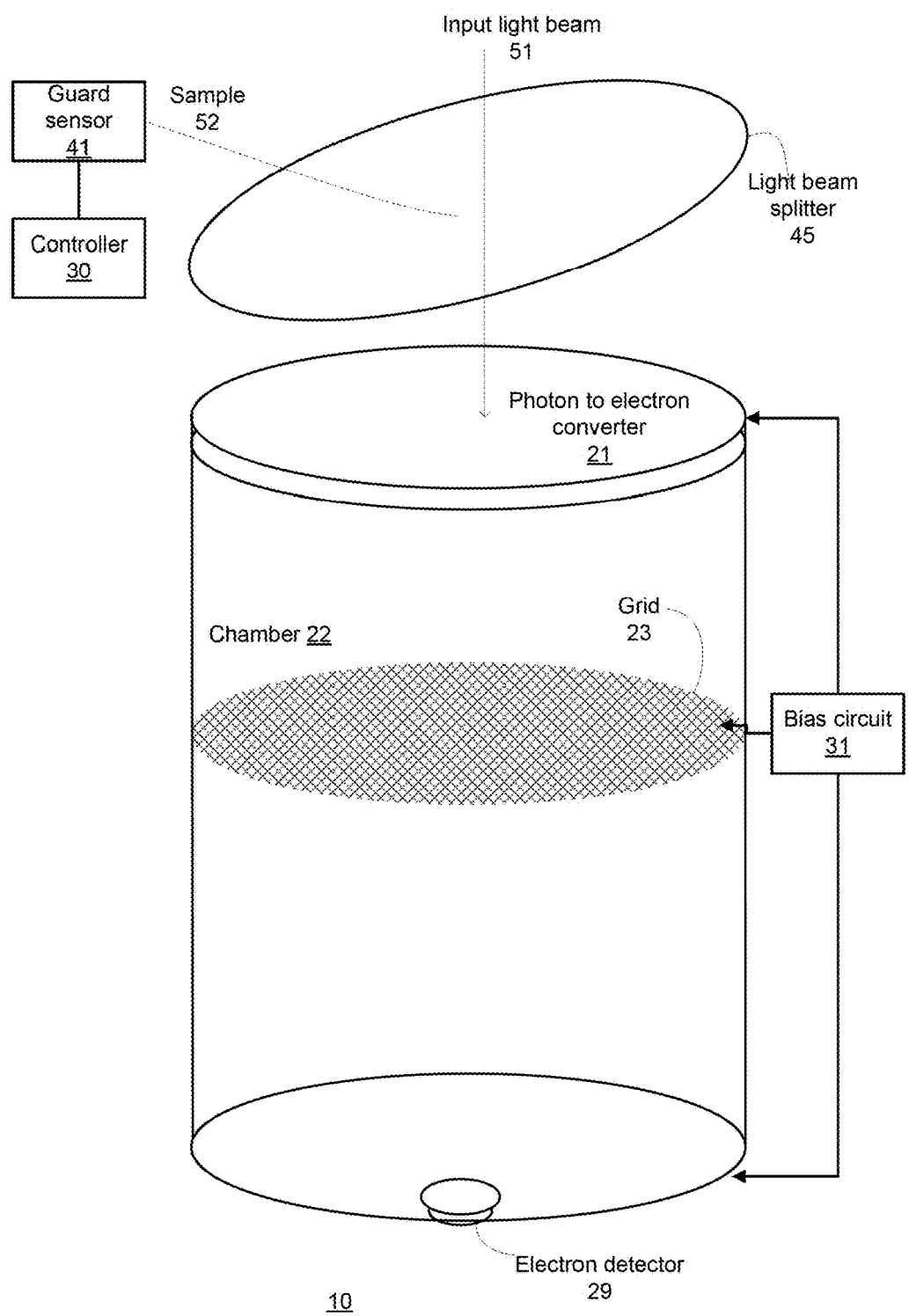
FIG. 9 illustrates an example of a light detector.

FIG. 9 illustrates a beam splitter 45 that precedes the photon to electron converter 21—and provides a sample of a light beam to the guard sensor 41—while allowing the majority of the light beam (or any other portion of the light beam) to impinge on the photon to electron converter 21. The guard sensor 41 senses the intensity of the beam and sends detection signals to the controller 30.

The grid, the capacitor and the antenna are not limiting examples of the photoelectron manipulator.

For example, the photoelectron manipulator may be a conductive aperture component that includes one or more apertures (through which the photoelectrons may pass) that differs from a grid.

Yet for another example the photoelectron manipulator may be a deflector, a deflection lens, and the like.

The response time of the photoelectron manipulator should be short enough to prevent damage or gain instability to the light detector 10 when sensing that a light beam (or a series of light beams) may damage or cause gain instability to the light detector 10. The response time may be less than a fraction of a second (for example—less than 1, 10, 100, 1000 microseconds).

The change between the different operational modes of the photoelectron manipulator may be fast, may be gradual or non-gradual. For example, the photoelectron manipulator may gradually deflect the photoelectrons from the photoelectron sensing region and the photoelectrons and/or may instantly block the progress of the photoelectrons towards the photoelectron sensing region.

It is noted that the photoelectron manipulator may include a combination of at least two elements out of a grid, a capacitor, a deflector and the like.

The bias circuit may include one or more high voltage power supply circuits that may bias the photoelectron manipulator or any other part of the light detector by one or more bias voltages that may have an absolute value that may range between zero and more than one thousand volts.

Figure 10:
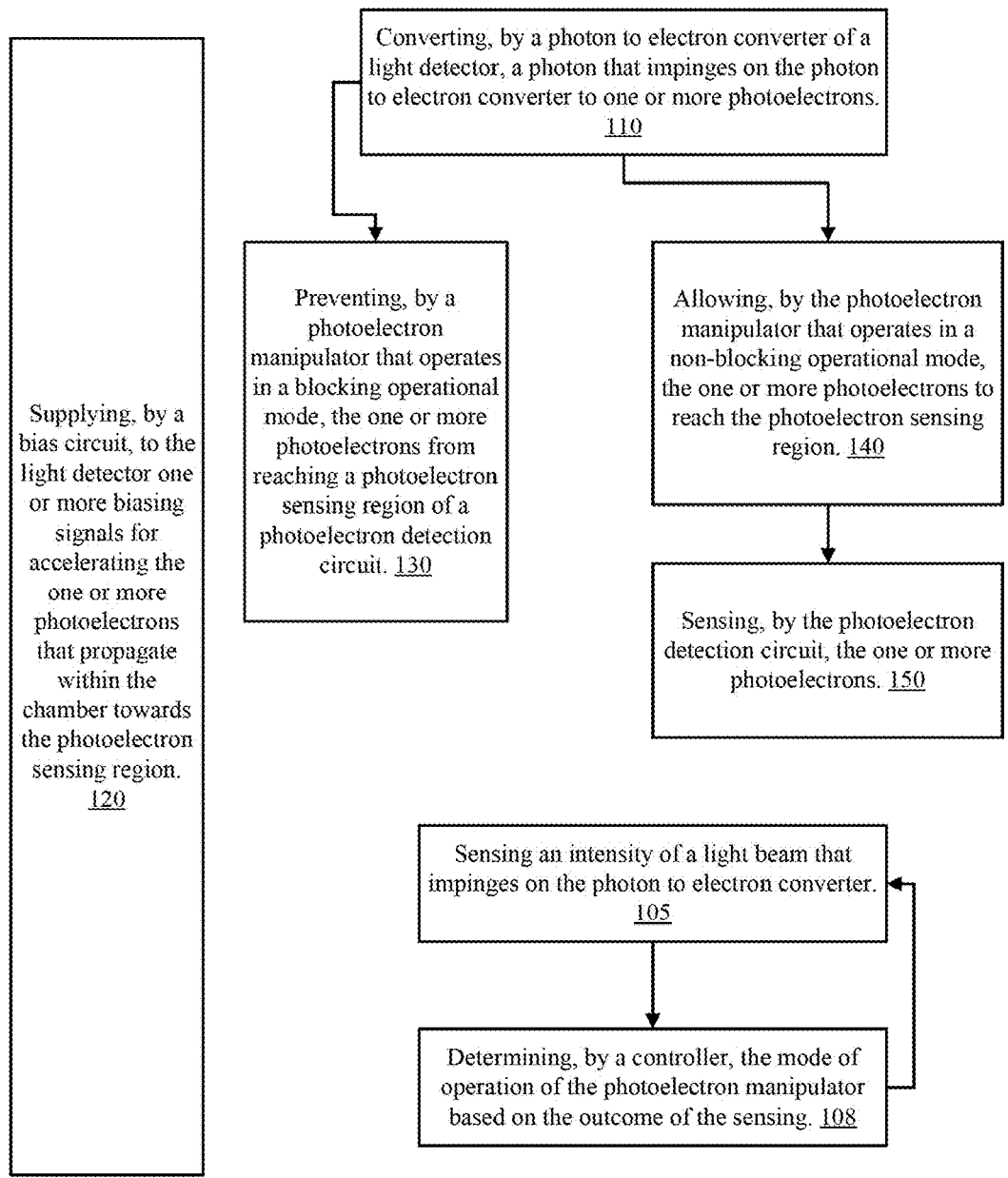
FIG. 10 illustrates an example of a method.

FIG. 10 illustrates method 100 according to an embodiment of the invention.

Method 100 starts by step 110 of converting, by a photon to electron converter of a light detector, a photon that impinges on the photon to electron converter to one or more photoelectrons.

Method 100 may also start by step 120 of supplying, by a bias circuit, to the light detector one or more biasing signals for accelerating the one or more photoelectrons that propagate within the chamber towards the photoelectron sensing region. The accelerating may be interrupted by the photoelectron manipulator. The accelerating, when not interrupted by the photoelectron manipulator, will cause the one or more photoelectrons to impinge onto the photoelectron sensing region.

Step 120 may include electrical biasing, magnetic biasing, or a combination of electrical biasing and magnetic biasing. Magnetic biasing may involve using a deflector type manipulator. The magnetic biasing may include applying a magnetic field perpendicular to the direction of propagation of the one or more photoelectrodes.

Step 120 may be followed by step 130 or step 140 depending upon the operational mode of the photoelectron detection circuit.

Step 130 may include preventing, by a photoelectron manipulator that operates in a blocking operational mode, the one or more photoelectrons from reaching a photoelectron sensing region of a photoelectron detection circuit.

Step 140 may include allowing, by the photoelectron manipulator that operates in a non-blocking operational mode, the one or more photoelectrons to reach the photoelectron sensing region.

Step 140 may be followed by step 150 of sensing, by the photoelectron detection circuit, the one or more photoelectrons. The photoelectron detection circuit may include the readout circuit and the photoelectron sensing region.

Method 100 may also include step 105 of sensing an intensity of a light beam that impinges on the photon to electron converter. The sensing may include a direct sensing (measuring the intensity of the light beam or a part of the light beam) or indirectly sensing the intensity (for example sensing currents or other signals developed in the electron to light converter) by one or more guard sensors.

Step 105 may be followed by step 108 of determining, by a controller, the selected operational mode of the photoelectron manipulator based on the outcome of step 105.

For example determining to operate the photoelectron manipulator in the blocking operational mode when the intensity of a light beam that impinges on the photon to electron converter exceeds a predefined value or exceeds certain values over a predefined period of time.

The modes of operation may include, in addition to the blocking operational mode and the non-blocking operational mode, multiple partial blocking modes that provide different amounts of partial blocking.

Figure 11:
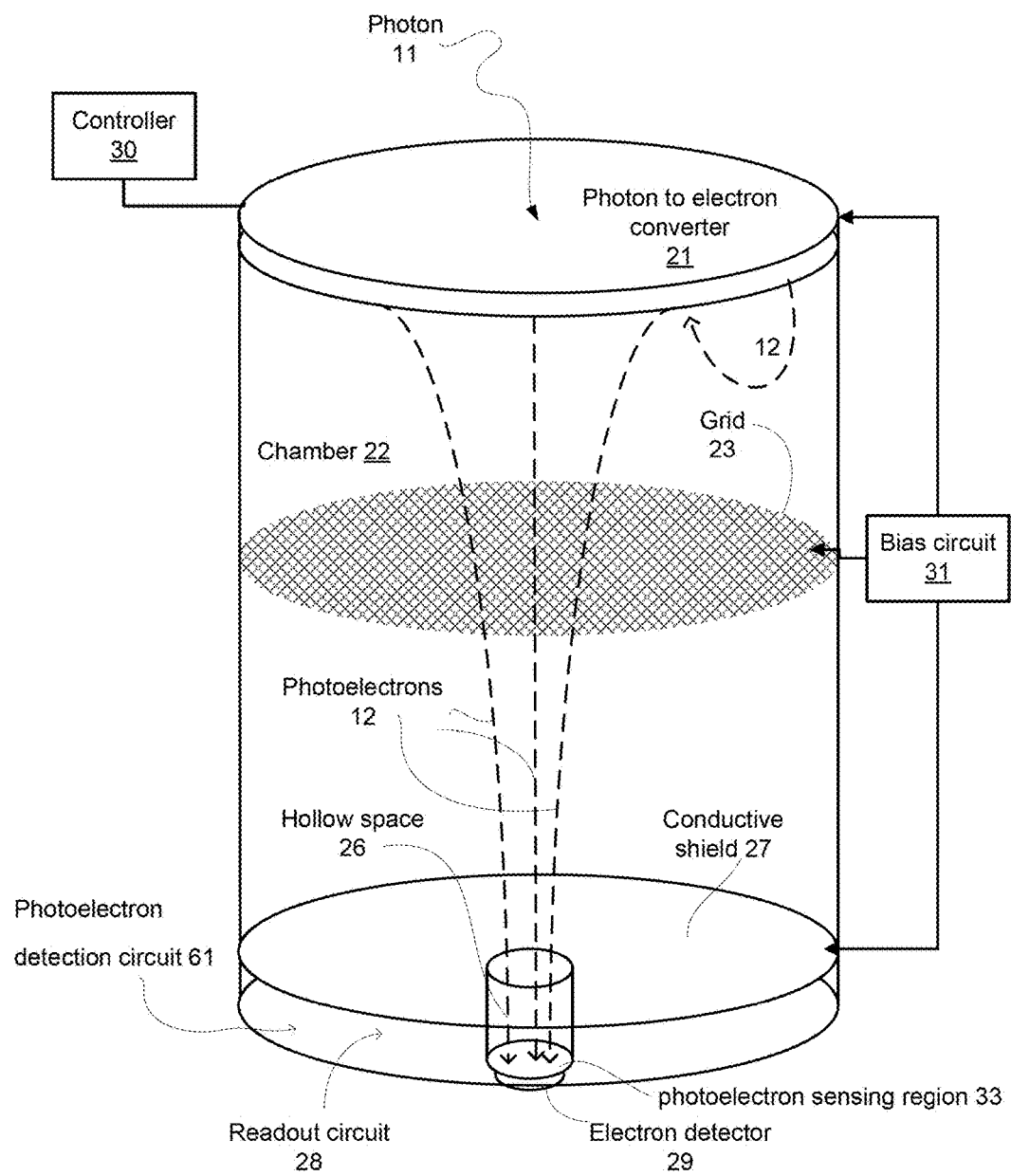
FIG. 11 illustrates an example of a light detector.

FIG. 11 illustrates the light detector 10 as including photon to electron converter 21, chamber 22, a photoelectron manipulator such as grid 23, electron detector 29 that is preceded by a hollow space 26, and a readout circuit 28 that are shielded by conductive shield 27, controller 30 and bias circuit 31.

In FIG. 11 the grid 23 partially blocks the photoelectrons from reaching the electron detector 29. Some of the photoelectrons outputted by photon to electron converter 21 return to the photon to electron converter 21 while other photoelectrons impinge on the electron detector 29.

There may be any relationship between the one or more photoelectrons that are generated by the photon to electron converter 21 and the number of photoelectrons that reach the electron detector 29. Different bias voltages may determine this ratio.

Figure 12:
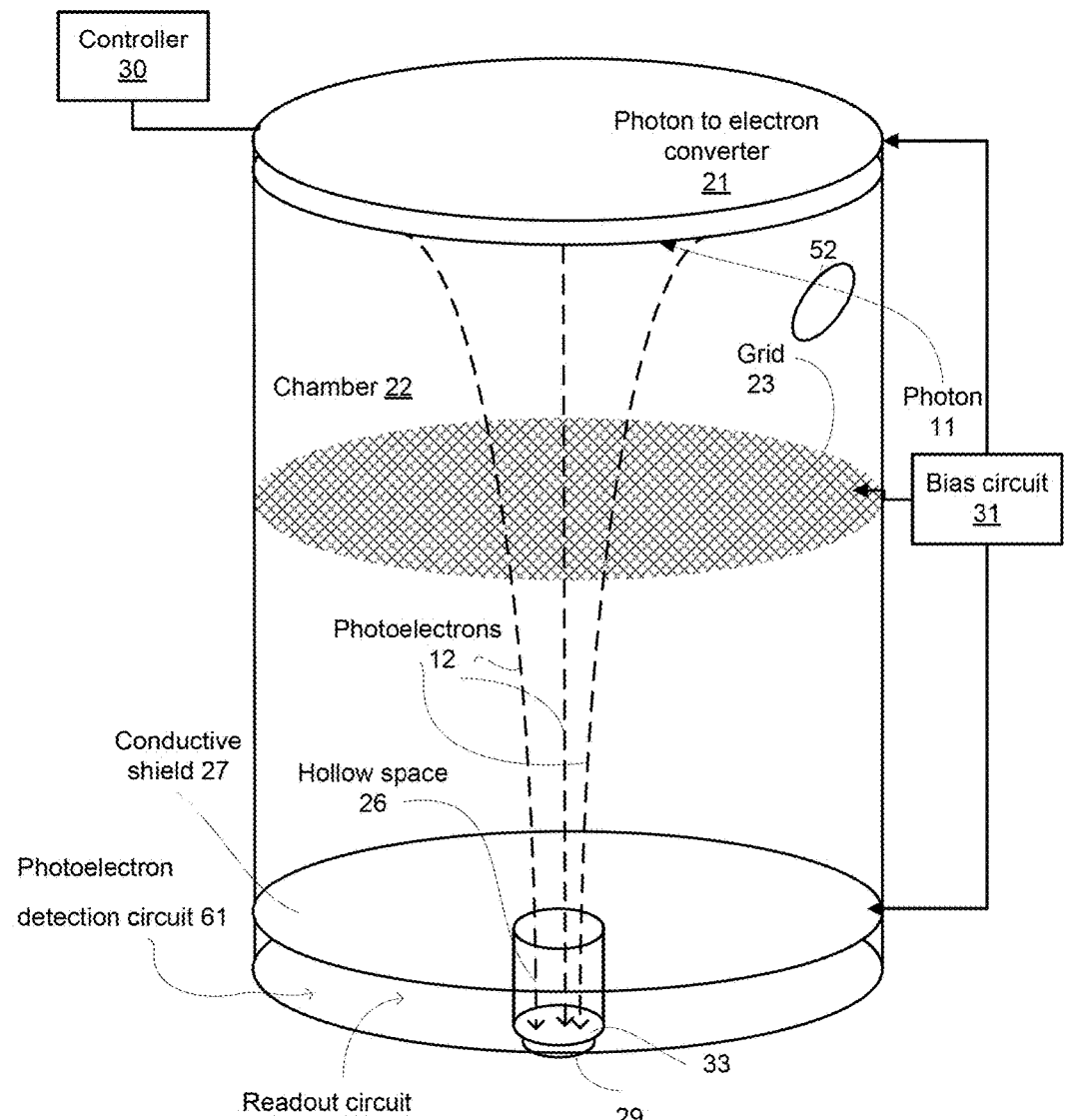
FIG. 12 illustrates an example of a light detector.

FIG. 12 illustrates a light detector 10 that operates in a reflection configuration. Light detector 10 includes passageway 52, photon to electron converter 21, chamber 22, a photoelectron manipulator such as grid 23, electron detector 29 that is preceded by a hollow space 26, and a readout circuit 28 that are shielded by conductive shield 27, controller 30 and bias circuit 31.

When operating a in a reflection configuration, the photon 11 travels through passageway 52, through the chamber 22 and impinges on the photon to electron converter 21. Passageway 52 may be formed anywhere, for example, it may be formed in a sidewall of the chamber 22 and above grid 23.

Figure 13:
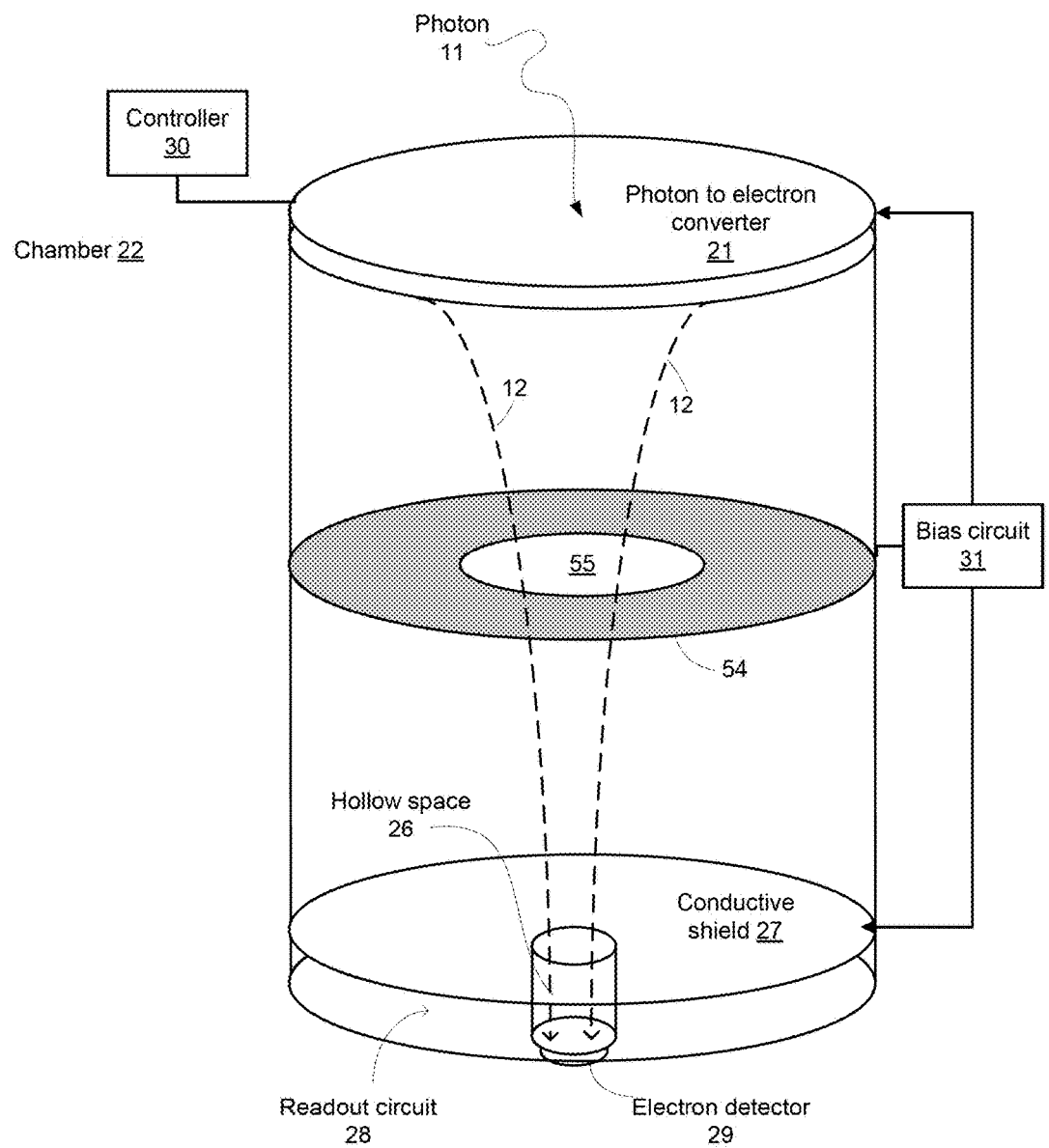
FIG. 13 illustrates an example of a light detector.

FIG. 13 illustrates the light detector 10 as including photon to electron converter 21, chamber 22, a photoelectron manipulator such as an apertured electrode 54 (having an aperture 55), electron detector 29 that is preceded by a hollow space 26, and a readout circuit 28 that are shielded by conductive shield 27, controller 30, and bias circuit 31.

The one or more photoelectrons may propagate (unless blocked) through aperture 55 and impinge on electron detector 29.

The level of blocking may be determined by the bias voltage supplied to the apertured electrode 54 by the bias circuit 31.

Figure 14:
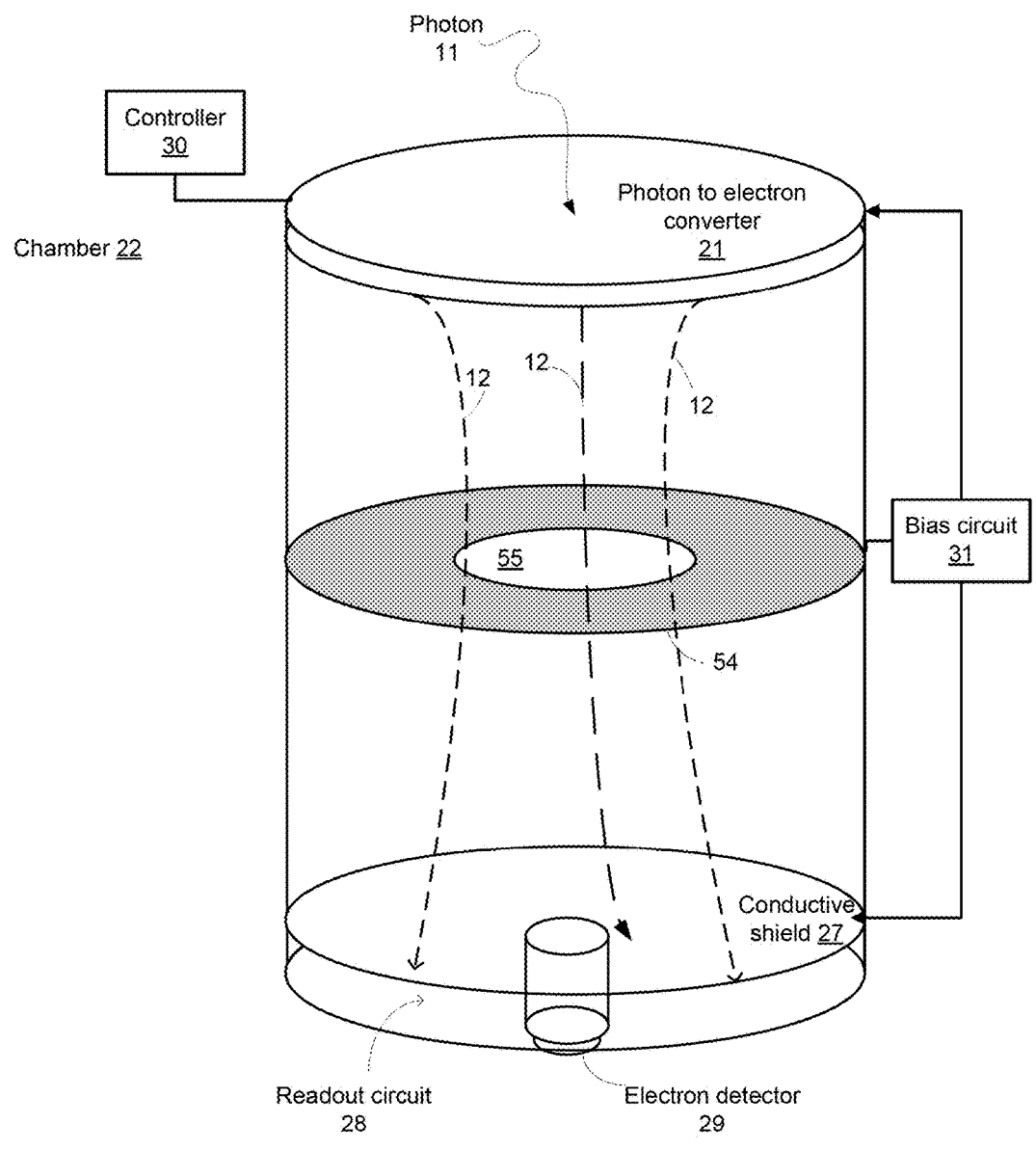
FIG. 14 illustrates an example of a light detector.
Figure 15:
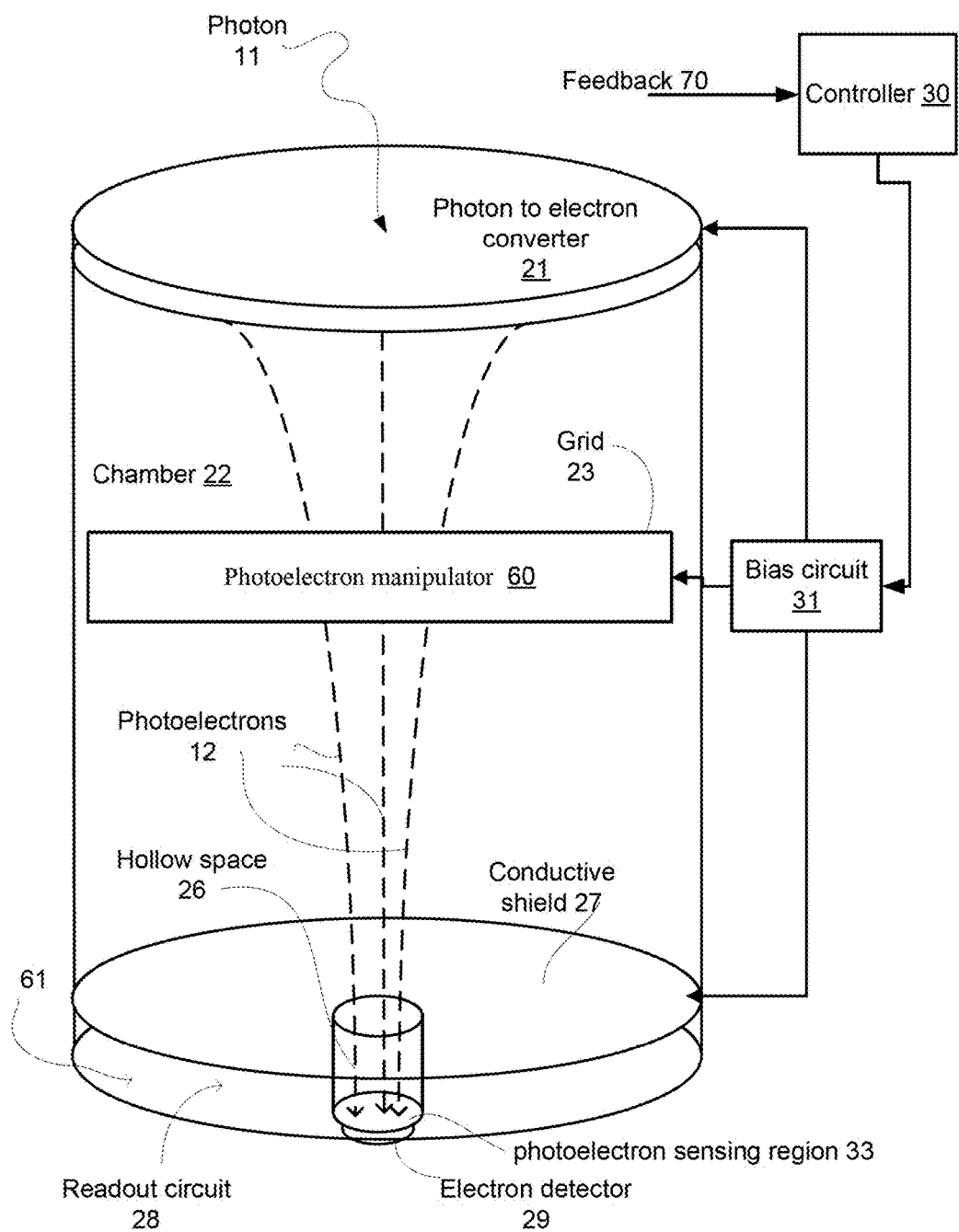
FIG. 15 illustrates an example of a light detector.

FIG. 14 illustrates the light detector 10 as including photon to electron converter 21, chamber 22, a photoelectron manipulator such as an apertured electrode 54 (having an aperture 55), electron detector 29 that is preceded by a hollow space 26, and a readout circuit 28 that are shielded by conductive shield 27, controller 30 and bias circuit 31. In FIG. 15 at least some of the photoelectrodes are prevented from reaching the electron detector by a defocusing of the beam that is formed by the one or more photoelectrons.

Any one of the light detectors of FIGS. 1-14 may include a controller 30 that is fed by feedback 70. The feedback may be indicative of any one of photon 11, the one or more photoelectrons 12, a previous photon that previously impinged on the photon to electron and, previous one or more photoelectrons that were previously outputted by the photon to electron converter.

The controller may control, based on the feedback, the photoelectron manipulator—thereby determining the level of blocking of the one or more photoelectrons from reaching the electron detector.

FIG. 15 illustrates the light detector 10 as including photon to electron converter 21, chamber 22, a photoelectron manipulator 60, electron detector 29 that is preceded by a hollow space 26, a readout circuit 28 that are shielded by conductive shield 27, controller 30, and bias circuit 31.

Controller 30 may control, based on the feedback, the photoelectron manipulator 60—thereby determining the level of blocking of the one or more photoelectrons 12 from reaching the electron detector 29.

The electron detector of any of the light detectors illustrated in any of the figures may include a single electron sensing element (single pixel) or may include an array of electron sensing elements (multiple pixels). The array of electron sensing elements may include one or more additional electron sensing elements. One or more electron sensing elements may be positioned within the same hollow space.

One or more electron sensing elements may be positioned within different hollow spaces. There may be any spatial relationship (within the chamber) between different electron sensing elements. There may be any spatial relationship (within the chamber) between different hollow spaces that least to different electron sensing elements.

The controller may be configured to control the photoelectron manipulator according to one or more schemes.

Assume for brevity (and referring to FIG. 15) that the photoelectron manipulator 60 is implemented by a grid and feedback 70 is read from the electron detector 29.

CE (Collection Efficiency) is the number of photoelectrons reaching the electron detector 29 relative to the number of photoelectrons emitted by the photon to electron converter 21.

A CE that equals one means that all the photoelectrons emitted by the photon to electron converter are detected. A CE that equals zero means that none of the photoelectrons emitted are detected.

$V_g$ is bias voltage provided from bias circuit 31 to the grid, or any other implementation of the photo-electron manipulator.

The specific mechanical and electronic aspects of the grid map a function relating the CE to the voltage applied to the grid—$CE(V_g)$.

Figure 16:
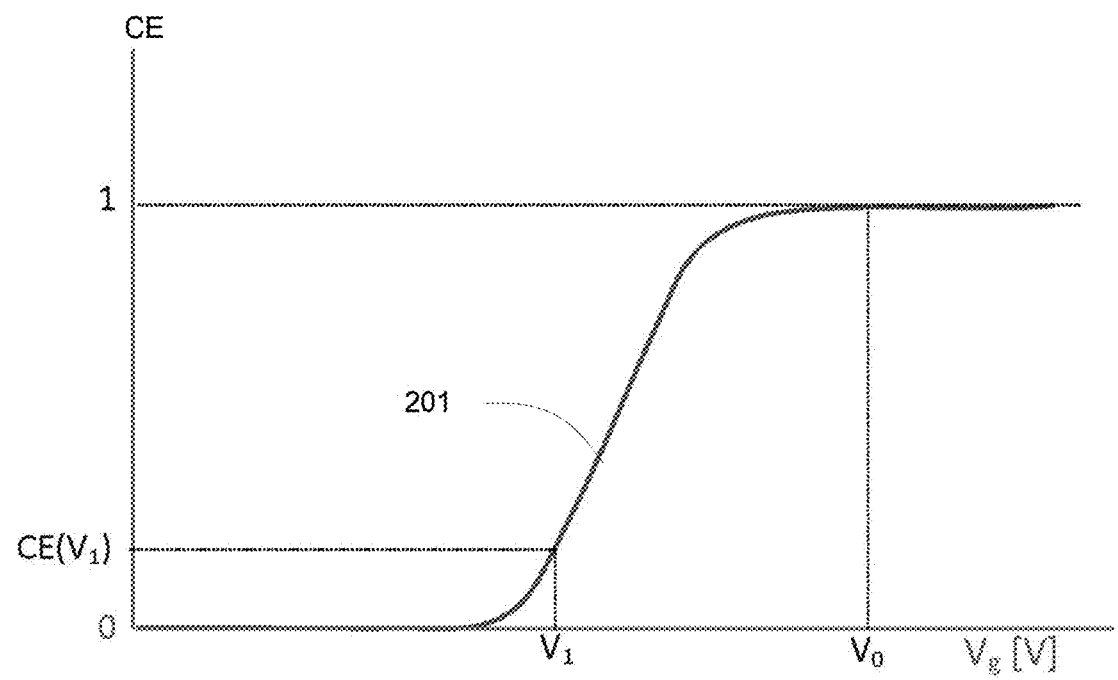
FIG. 16 illustrates an example of a function that maps collection efficiency to the voltage applied to the grid.

A schematic drawing of the CE to voltage applied to the grid function is illustrated in FIG. 16. Curve 201 illustrates the relationship between CE and $V_g$.

$I_c(t)$—photoelectron current as emitted by photon to electron converter. $I_c$ is an unknown function proportional to the input photon flux during a wafer scan application.

$I_s(t)$—electron sensor current (which is also the input to the grid control in an example). This current is given by:

$I_s(t)=G*I_c(t)*CE(V_g(t))$ where G is the gain of the sensor (which may be a constant in time).

The purpose of the gating is to 'cut off' $I_s$ at 'too high' inputs in order to satisfy the light detector gain stability constraints and/or to avoid damage to the light detector and other sensitive electronic components along the output signal path.

We mark $V_0$ as the voltage of the grid when it is in 'non-blocking' mode (or 'off' mode): $CE(V_0)=1$.

The photoelectron manipulator may operate in a two-state switching.

Grid 'blocking on' switch—In this case we define a second voltage $V_1$ where:

$$1 > CE(V_1) \geq 0.$$

Assume, to begin with, that the gate voltage is $V_0$ therefore the current at the sensor is given by:

$$I_s(off)=G*I_c*CE(V_o)=G*I_c.$$

By passing a certain threshold current, $I_s(th_{on})$ the dynamical control loop switches the gating bias voltage to $V_1$ so that the current on the sensing device drops to: $I_s(on)=G*I_c*CE(V_1)$.

Grid 'blocking off' switch—By dropping below a certain new threshold current, $I_s(th_{off})$, where $I_s(th_{off})$ can be (but not limited to) $I_s(th_{off}) \approx I_s(th_{on})*CE(V_1)$, the control loop switches the gate back to $V_0$ and returns to normal use.

When $V_1$ is set such that $CE(V_1)=0$ (i.e. full blocking) then sensing from the electron sensor 29 will not be able to supply the 'off' signal (since $I_s$ will be zero irrespective of $I_c$). In this case the sensor for the feedback control loop may be from another source—such as sampling the input light beam 51—as illustrated in FIG. 9.

The photoelectron manipulator may operate in a selected multi-state switching.

The multi state switching is similar to two states switching but with a number of $V_i$'s for different CE levels and a corresponding amount of current thresholds.

The photoelectron manipulator may operate in a continuous manner.

Instead of using threshold values, the control loop may map a continuous function between the voltage to be applied $V_g(t+dt)$ and the measured current $I_s(t)$. We will refer to this function as CL such that:

$$Vg(t+dt)=CL(I_s(t),Vg(t))$$

Figure 17:
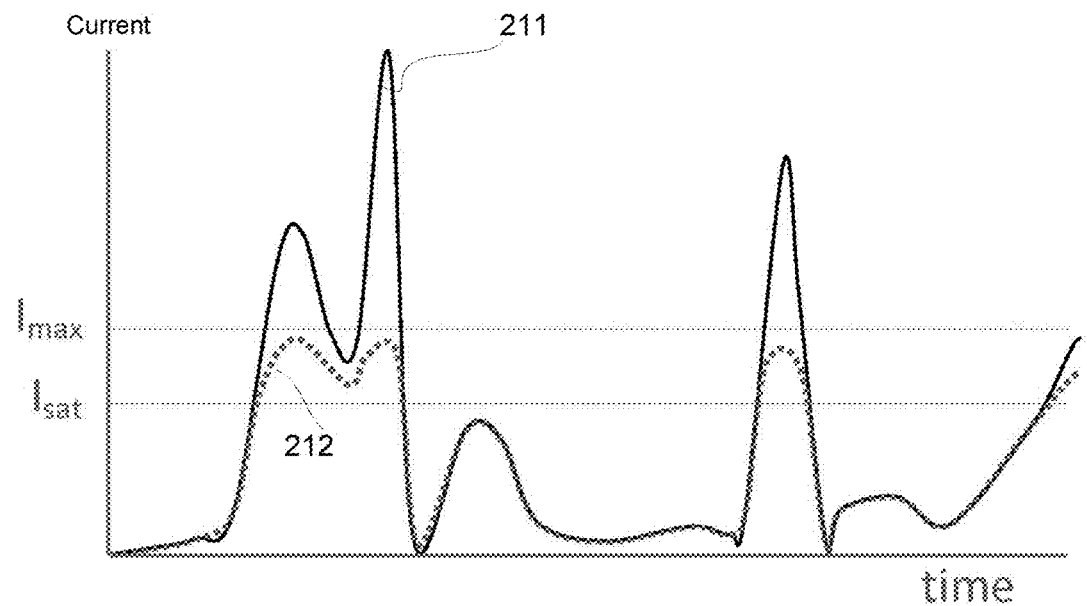
FIG. 17 illustrates an example of currents versus time.

For example, we may design CL in such a way to limit $I_s$ to be close to a maximal current ($I_{max}$) above some 'saturation' current ($I_{sat}$), while below $I_{sat}$ the grid will be in 'off' mode ($I_s=G\ I_c$)—as illustrated in FIG. 17. In FIG. 17 curve 212 illustrates $I_s$ while curve 211 illustrates $G*I_c$.

The photoelectron manipulator may operate in to provide a non-linear response

Non-linear response is a 'refined' use of the continuous method whereby by careful control of the CL function the input signal ($I_c$) can robustly and deterministically be mapped into a nonlinear output signal ($I_s$). An example of such a function may be:

$$I_s = G \cdot I_c \quad \text{for } I_s < I_{sat}$$

$$I_s = I_{sat} + \log\left(\frac{GI_c}{I_{sat}}\right) \quad \text{for } I_s > I_{sat}$$

In this way the input signal can be used entirely and not cut off at high enough input.

Figure 18:
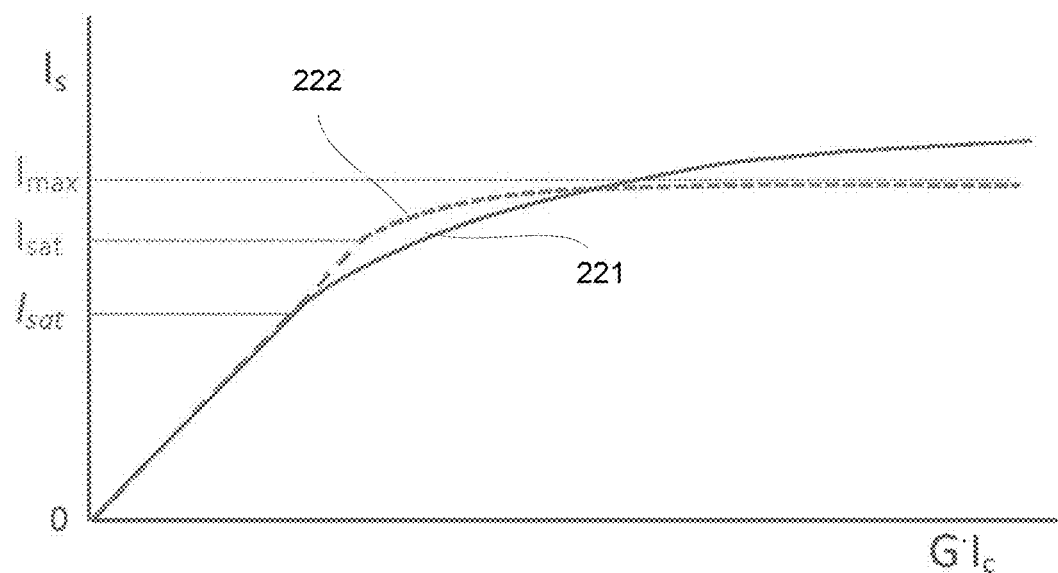
FIG. 18 illustrates examples of a differences between continuous and non-linear modes of operation.

FIG. 18 illustrates the differences between the continuous and nonlinear modes of operation. The x-axis is $G*I_c$ and the y-axis is $I_s$. Curve 221 illustrates the relationship between $G*I_c$ and $I_s$ in nonlinear operational mode while curve 222 illustrates the relationship between $G*I_c$ and $I_s$ in a continuous operational mode.

While a number of exemplary aspects and embodiments have been discussed above, those of skill in the art will recognize certain modifications, permutations, additions, and sub combinations thereof. It is therefore intended that the following appended claims and claims hereafter introduced be interpreted to include all such modifications, permutations, additions and sub-combinations as are within their true spirit and scope.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description. While preferred embodiments of the present invention have been shown and described, it should be understood that various alternatives, substitutions, and equivalents can be used, and the present invention should only be limited by the claims and equivalents thereof.

What is claimed is:

1. A light detector, comprising:
    a photon to electron converter that is configured to convert a photon that impinges on the photon to electron converter to one or more photoelectrons;
    a photoelectron detection circuit that comprises a photoelectron sensing region;
    a chamber;
    a bias circuit that is configured to supply, to the light detector, one or more biasing signals for accelerating a propagation of the one or more photoelectrons within the chamber towards the photoelectron sensing region;
    a photoelectron manipulator that is configured to operate in a selected operational mode out of multiple operational modes, the multiple operational modes differing from each other by a level of blocking of the one or more photoelectrons from reaching the photoelectron sensing region; and a controller that is configured to control the level of blocking of the one or more photoelectrons by the photoelectron manipulator based on a feedback from a sensor about at least one of (a) the photon, (b) the one or more photoelectrons, (c) a previous photon that previously impinged on the photon to electron converter, and (d) a previous one or more photoelectrons that were previously outputted by the photon to electron converter.

2. The light detector according to claim 1, wherein the controller is configured to control the photoelectron manipulator by selecting the selected operational mode.

3. The light detector according to claim 1, wherein the multiple operational modes comprise a full blocking mode during which the photoelectron manipulator is configured to completely prevent the one or more photoelectrons from reaching the photoelectron sensing region.

4. The light detector according to claim 1, further comprising the sensor, wherein the sensor is positioned within the light detector.

5. The light detector according to claim 1, wherein the sensor is external to the light detector.

6. The light detector according to claim 1, wherein the sensor is configured to sense one or more electric outputs of the light detector.

7. The light detector according to claim 1, wherein the feedback is indicative of an intensity of at least a portion of a light beam that impinges on the photon to electron converter.

8. The light detector according to claim 1, wherein the feedback is indicative of a current of at least a portion of the photoelectrons that are detected by the photoelectron detection circuit.

9. The light detector according to claim 1, wherein the feedback is indicative of a current of at least a portion of the photoelectrons that are emitted by the photon to electron converter.

10. The light detector according to claim 1, wherein the photoelectron manipulator is configured to at least partially block the one or more photoelectrons from reaching the photoelectron sensing region by directing the one or more photoelectrons towards the photon to electron converter.

11. The light detector according to claim 1, wherein the photoelectron manipulator is configured to at least partially block the one or more photoelectrons from reaching the photoelectron sensing region by directing the one or more photoelectrons towards the chamber.

12. The light detector according to claim 1, wherein the photoelectron manipulator is configured to at least partially block the one or more photoelectrons from reaching the photoelectron sensing region by directing the one or more photoelectrons towards a part of the photoelectron detection circuit that differs from the photoelectron sensing region.

13. The light detector according to claim 1, wherein the photoelectron manipulator is configured to at least partially block the one or more photoelectrons from reaching the photoelectron sensing region by defocusing the one or more photoelectrons.

14. The light detector according to claim 1, wherein the controller is also configured to control the photoelectron manipulator based on estimated mapping between (a) a control voltage supplied to the photoelectron manipulator, and (b) photoelectron collection efficiency; and wherein the photoelectron collection efficiency is a ratio between (i) a number of photoelectrons that reach the photoelectron sensing region, and (ii) a number of photoelectrons that are emitted by the photon to electron converter.

15. The light detector according to claim 1, further comprising at least one additional photoelectron detection circuit that comprises at least one additional photoelectron sensing region.

16. The light detector according to claim 1, wherein the photoelectron manipulator is a conductive apertured component that comprises one or more apertures.

17. The light detector according to claim 16, wherein the conductive apertured component is a conductive grid.

18. The light detector according to claim 16, wherein the conductive apertured component is a deflector.

19. The light detector according to claim 18, wherein the deflector comprises a capacitor.

20. A method for light detection, comprising:
  converting, by a photon to electron converter of a light detector, a photon that impinges on the photon to electron converter, to one or more photoelectrons;
  supplying, by a bias circuit, to the light detector, one or more biasing signals for accelerating the one or more photoelectrons while the one or more photoelectrons propagate within a chamber of the light detector towards a photoelectron sensing region of the light detector;
  operating a photoelectron manipulator in a selected operational mode out of multiple operational modes that differ from each other by a level of blocking of the one or more photoelectrons from reaching the photoelectron sensing region;
  controlling the level of blocking of the one or more photoelectrons by the photoelectron manipulator based on feedback from a sensor about at least one of (a) the photon, (b) the one or more photoelectrons, (c) a previous photon that previously impinged on the photon to electron, and (d) a previous one or more photoelectrons that were previously outputted by the photon to electron converter; and
  sensing, by the photoelectron detection circuit, the one or more photoelectrons when the one or more photoelectrons impinge on the photoelectron sensing region.

* * * * *